Figure 1:
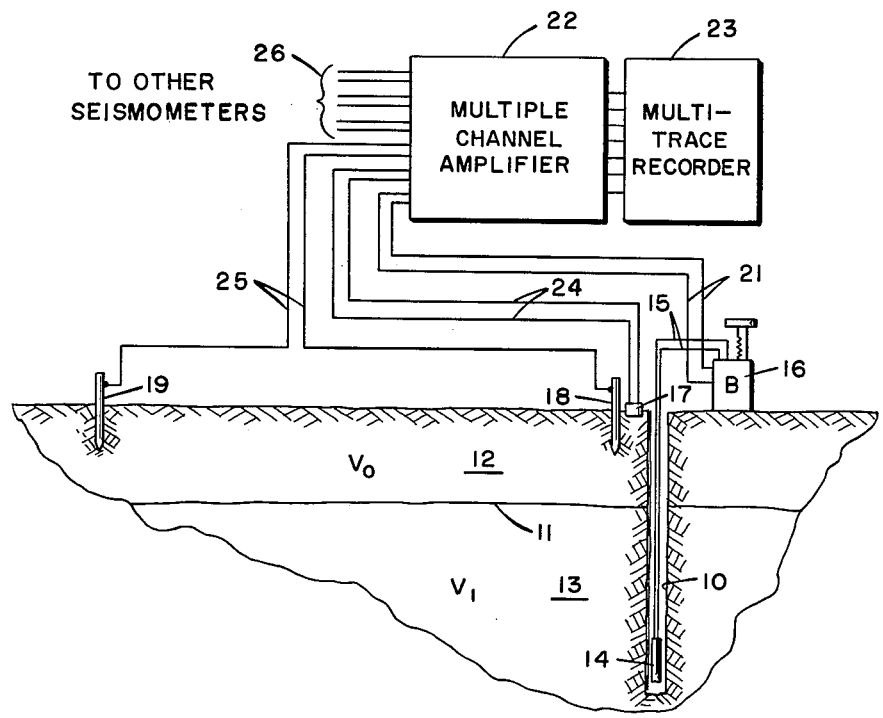

Nov. 27, 1962  S. T. MARTNER ETAL  3,065,814
SEISMIC WEATHERING CORRECTION

Filed Jan. 24, 1957                    2 Sheets-Sheet 1

INVENTORS:
SAMUEL T. MARTNER
BY NEIL R. SPARKS

Newell Pottoff
ATTORNEY

Nov. 27, 1962  S. T. MARTNER ETAL  3,065,814
SEISMIC WEATHERING CORRECTION

Filed Jan. 24, 1957  2 Sheets-Sheet 2

INVENTORS:
SAMUEL T. MARTNER
BY NEIL R. SPARKS

ATTORNEY

United States Patent Office 3,065,814
Patented Nov. 27, 1962

3,065,814
SEISMIC WEATHERING CORRECTION
Samuel T. Martner and Neil R. Sparks, Tulsa, Okla., assignors to Pan American Petroleum Corporation, Tulsa, Okla., a corporation of Delaware
Filed Jan. 24, 1957, Ser. No. 636,156
5 Claims. (Cl. 181—.5)

This invention relates to seismic geophysical surveying and is directed particularly to the determination of weathering corrections. More particularly, the invention is directed to a novel method for determining the travel time of seismic waves in the weathered layer.

Both the need for and methods of making weathering corretions to the travel time of seismic waves in seismic geophysical prospecting have long been well known. For example, in initiating seismic waves by detonating explosive charges in bore holes, it has been a common practice to place a shot-point seismometer at the ground surface near the mouth of the shot hole and record the vertical wave travel times for each of a number of shot depths. By plotting the observed travel times as a function of depth over a depth range extending from above to below the bottom of the weathered layer, the depth of the layer and the travel time of waves therein can be readily and accurately ascertained.

It is also known that the generation and transmission of seismic waves in and through the earth are accompanied by certain electrical phenomena. One of these is the well-known seismic-electric effect, which is generally considered to be a varying of the resistivity of the earth medium by the waves passing through it. Ordinarily the effect is observable only in the presence of a natural or artificial electric current in the earth, either as a variation in the current flow itself or in its potential drop across a resistance or through the earth. When the magnitude or polarity of the current changes, the magnitude or polarity of the observed seismic-electric effect changes correspondingly.

Less well-known is another electrical phenomenon which we have observed and utilized in the practice of our invention. This is a voltage impulse observed under certain circumstances when seismic waves travel through the earth away from a generator such as an explosive charge detonated in a shot hole. Unlike the seismic-electric effect, this voltage is observed without regard to whether there is any electric current already flowing in the earth due to natural or artificial causes that are unrelated to the phenomenon itself. Its magnitude does not vary when the natural or artificial currents change magnitude or even reverse direction. Its polarity depends only on the direction of seismic wave travel past an electrode array and thus reverses when the direction of wave travel reverses.

While the voltage impulses which we have observed and utilized are thus in one sense independent of current flow in the earth, in that they are not in any way related to the usual natural or artificial currents or potentials detected between spaced points on the ground surface, this does not mean that there is no current flow associated with the impulses themselves. On the contrary, it is likely that there are substantial impulses of electric current in the earth associated with the voltage impulses we observe, either as cause or effect. These may be termed "related" currents, however, to differentiate them from the "unrelated" currents that are due to other causes or effects, either natural or artificial. It is in this sense that the term "independent of unrelated current flow" has been used in the claims to distinguish from the seismic-electric effect.

Our observations have shown that a voltage impulse of distinctive form appears to be generated when seismic waves impinge on the interface between two layers of sufficiently different properties. Specifically, when a shot is fired below the weathered layer, the arrival of the resulting seismic wave front at the base of this layer produces an effect which is almost instantaneously detected as a voltage impulse at the ground surface. Accordingly, we have found that by detecting both this impulse and the actual arrival of the seismic wave front itself at the ground surface, the difference between the impulse and wave-front arrival times is a direct indication of the travel time of the seismic waves in the weathered layer.

The arrangement of apparatus for determining weathering travel times by the method of this invention therefore includes a conventional shot-point seismometer and a pair of spaced electrodes contacting the ground surface, one preferably near the top of the seismic shot hole and the other at some distance further away. When the explosive charge is detonated, a record is made of the voltage outputs of the seismometer and the electrodes as a function of time. Reading off the difference in arrival times of the electrical voltage impulse and the seismic wave front, respectively shown by the electrode and seismometer traces, gives the seismic-wave travel time in the weathering directly.

Figure 2:
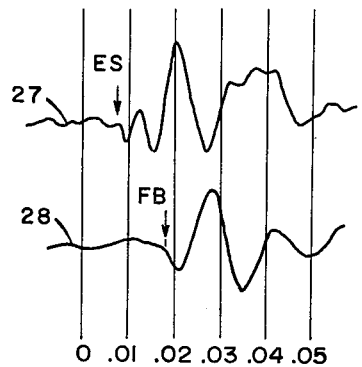
Figure 3:
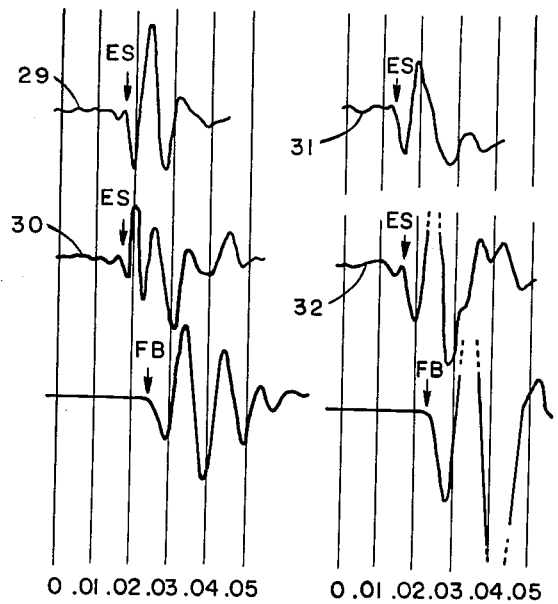
Figure 4:
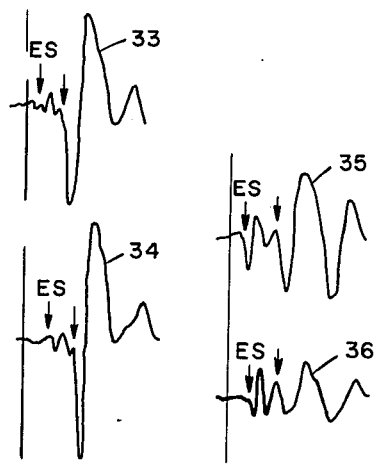

This will be better understood by reference to the figures of drawing forming a part of this application. In the drawing, FIGURE 1 shows, in diagrammatic form, a typical arrangement of apparatus for determining the weathering time in accordance with the invention; and FIGURES 2, 3 and 4 show a number of typical forms of the waves received at different locations.

Referring now to the drawings in detail, a typical arrangement of apparatus for observing and recording what we have called the "electro-seismic voltage" effect, as differentiated from the well-known "seismic-electric" resistance effect, is shown in FIGURE 1. A portion of the earth's surface and sub-surface shown diagrammatically in cross-section is penetrated by a shot hole 10 extending to some depth below the weathered-layer interface 11 between the low-velocity surface layer 12 of seismic-wave velocity $V_0$ and the sub-weathering layer 13 of higher velocity $V_1$. For generating the effect and also producing seismic waves for surveying purposes, if desired, a charge of explosive 14 is placed at some distance below the interface 11 in the shot-hole 10, which charge is adapted to be detonated by any suitable means such as an electric current applied over the leads 15 extending from the charge 14 to a blaster 16 at the ground surface.

Close to the top of shot hole 10 at the ground surface is planted a shot-point seismometer 17 for detecting a function of the ground motions caused by the seismic waves, while an electrode 18 such as a steel stake driven into the ground surface makes electrical contact with the ground. A second similar electrode 19 contacts the ground at some point relatively farther away from the top of the shot hole than the electrode 18, for example, at a distance of 20 to 200 feet or more. The exact spacing of the electrodes 18 and 19 from the shot hole is not important as long as the closer electrode 18 is substantially nearer than the remote electrode 19 to the shot hole. Tpyically, the closer electrode 18 is placed in the slush pit used in the drilling of the shot hole 10 with a rotary drill rig, and is thus within 2 to 10 feet of the shot hole 10, but it could of course be much farther away.

By means of the pairs of electrical leads 21, 24, and 25, the firing circuit of blaster 16, the shot-point seismometer 17, and the electrode pair 18 and 19, are respectively connected to individual channels of a multiple-channel amplifier 22 for recording as separate traces by a multiple-trace recorder 23. The amplifier 22 and recorder 23 may be conventional units of any desired type used in seismic geophysical surveying. Any required number of additional leads 26 as may be necessary are provided to connect the various channels of amplifier 22 to other seismometers (not shown) set in any appropriate seismometer spread arrangement, as it will be understood that the invention may be utilized simultaneously with the recording of conventional seismic records.

In operation, the blaster 16 is actuated to detonate the charge 14, and the resultant electrode voltages and wave arrivals both at the shot-point and the spread seismometers are recorded by the recorder 23 in the ordinary manner of seismic recording. In FIGURE 2 are shown the beginnings of the electrode voltage and the up-hole seismometer traces 27 and 28 respectively. The event shown on trace 27 beginning at the time marked "ES" is a typical electro-seismic voltage impulse which is observed in accordance with the present invention. The time marked "FB" on the seismometer trace is the conventional up-hole seismometer first break determined in the usual way. The time interval of about 11 milliseconds between ES and FB is the travel time of the seismic waves from the weathered-layer interface 11 to the ground surface at the location where these waves were recorded. The time-break trace received from blaster 16 is not shown in this drawing but has been utilized in placing the timing-line grid on this figure. This is also true of all other tracings of records shown in these drawings.

In FIGURE 3 are shown several similar tracings of electro-seismic voltages and seismometer-determined wave arrivals made at a location far removed from that where the traces of FIGURE 2 were recorded. As appears in FIGURE 3, the electro-seismic voltage impulse associated with the base of the weathered layer is not always the first impulse observed on the electrode trace. It is usually, however, the first prominent event observed. In the traces of FIGURE 3 a small-amplitude precursor event is observable, which is thought to be due to the seismic wave-front impingement upon an interface at some depth below the weathered-layer interface. Ordinarily, however, such impulses are of sufficiently small magnitude, or are sufficiently attenuated relative to the impulse generated at the base of the weathering, that little difficulty is experienced in distinguishing between them. The weathering-interface impulse is almost always the earliest prominent and distinctive impulse, although as will be seen later, it is not always the largest voltage impulse observed.

The traces 29 and 30 illustrate the effect of electrode separation and placement. The trace 29 was recorded with electrodes 18 and 19 positioned at 2 and 80 feet respectively on one side of the shot hole, while the trace 30 was simultaneously recorded with another pair of electrodes at distances of 5 and 15 feet, respectively, in a different direction from the shot hole. As can be seen, the larger spacing produced an electro-seismic voltage impulse of substantially larger amplitude than the smaller spacing, although the amplitudes are not in direct proportion to the spacings. The traces 31 and 32 made at different but adjacent locations from each other, which locations were not far from the shot hole where traces 29 and 30 were obtained, show some of the variations in character of the electro-seismic voltage impulse that may be encountered.

That the electro-seismic voltage impulse associated with the base of the weathered layer is not necessarily the only or the major impulse observed at a seismic surveying location is illustrated in FIGURE 4, which is a recording from an area substantially different from that where the wave forms of FIGURES 2 and 3 were obtained. Traces 33 and 34 were obtained at two different times in a given shot hole from charges placed at two different depths. The impulse which is to be associated with the base of the weathered layer is again marked "ES." The layer thickness, however, is substantially greater than in the case of FIGURES 2 and 3.

The same is true of the traces 35 and 36, which were obtained in the same general area as traces 33 and 34 but in a different shot hole. Although the impulse marked "ES" on these traces is the first distinctive impulse in most cases, it is obviously not the largest impulse, but is generally smaller than that indicated by the unlabeled arrow following it by several milliseconds. The later and larger impulse appeared to be associated with an interface nearer the surface than the base of the weathered layer, but its identification has not been made certain.

It is likely that the smaller amplitude of the ES impulse in FIGURE 4, relative to its size in FIGURES 2 and 3, is due to a greater attenuation in traveling at electromagnetic-wave velocity through the thicker weathered layer. By locating the electrodes 18 and 19 at various distances from the shot point a definite effect of attenuation of the electro-seismic voltage impulse with increasing distance has been noted. The converse of this may explain the large amplitude of the impulse following the electro-seismic voltage impulse from the bottom of the weathered layer in FIGURE 4. Even though the magnitude of the voltage impulse generated at the upper interface may not be correspondingly larger than the impulse created at the weathering interface, it may appear to be larger, as received, because of reduced attenuation in the very near surface layers.

The variations in potential recorded as the electro-seismic voltage impulses in these figures represent amplitudes in the range from about 1 to about 10 millivolts. This is many times larger than the usual seismic-electric effect, due to variation in ground resistivity, which may sometimes be observed due to its effect on the natural earth currents flowing in the earth. Ordinarily, there is such a small flow of these currents between the electrodes 18 and 19 that it can be disregarded. If, however, it is found that the earth-current flow is appreciable, so that there is some possibility of observing the conventional seismic-electric effect, this current can be easily balanced out by applying a reverse potential to the electrodes. Furthermore, the effect utilized in the present invention can normally be readily distinguished from the ordinary seismic-electric effect accompanying the wave-front arrival at the ground surface, in that the impulses herein utilized are received far enough in advance of the seismic-wave arrival to be separately recognized.

As regards the placement of the electrodes, and particularly the distant electrode 19, its separation from the shot point is of less importance than its direction in most instances. It is frequently found that 60-cycle alternating current is flowing in the ground subsurface even at substantial distances from power distribution lines. It is ordinarily possible, however, to find a location for the electrode 19 at a desired spacing from the shot point 10 where the 60-cycle interference pick-up is minimized. It may also be desirable to utilize on occasion the 60-cycle rejection or cancellation circuits normally present in each seismic amplifier channel. Or a combination of rejection circuits together with a choice of placement of the remote electrode 19 will normally be effective to eliminate substantially both the 60-cycle interference and some of its more troublesome harmonics. In particular, we have been able specifically on occasions to eliminate substantially interference both from the 60-cycle fundamental and from its third and fifth harmonics at 180 and 300 cycles, respectively.

As regards the electrodes 18 and 19, both non-polarizing types and polarizable types such as steel-stake electrodes have been tried. The non-polarizing electrodes, formed generally of porous ceramic cups containing an electrolyte solution, gave substantially identical results with the steel-rod electrodes on those occasions where they were compared, so that steel-rod electrodes have been used subsequently due to their greater convenience. It appears that such polarization as may occur in using steel-rod or stake electrodes is not such as can substantially affect the transient voltages which constitute the electro-seismic voltage effect that is detected in this invention.

It may be thought that the principles of this invention will be applicable to determining the travel time of seismic waves through the weathering at large distances from the shot point. In a few instances, it appeared that this might be possible. In most instances, however, the impulses detected by pairs of electrodes at large spacings from the shot point appeared to be the same impulses as those detected with an electrode set close to the shot point but with greater attenuation. Accordingly, it must be considered on the basis of our present knowledge that the effect utilized herein cannot always be relied on for weathering-time determinations at large distances from the shot point. In some areas, however, it may be found that weathering-time variations along a spread will be revealed by electrode pairs spaced along it.

An investigation has also been made of the effect of locating the near electrode 18 at some depth below the ground surface. By placing it at various positions in an observation hole close to the shot hole 10, it was found that the impulse varied in amplitude only in a minor way until the electrode approached the interface 11, at which time the impulse changed polarity rather abruptly. This appears to be additional evidence tying the origin of the impulse to the interface at the base of the weathered layer.

Some consideration has been given to the question of whether the impulse is associated with the subsurface water table rather than the base of the weathering. In FIGURES 2 and 3 it is likely that these depths coincided approximately; but with regard to FIGURE 4, it was definitely observed that the water table was at a different depth from the base of the weathered layer. The ES impulses observed in FIGURE 4 could be definitely associated with the base of the weathered layer rather than the water table.

A point of possible further interest is that the polarity of connection of the electrodes 18 and 19 was such that a positive voltage of the electrode 18 relative to 19 produced a downward deflection of the electrode trace. This same relative polarity of the electrodes, so that the near electrode 18 could be regarded as a "positive" electrode, appeared to be preserved in substantially all configurations of electrodes investigated, as long as they were not substantially equidistantly spaced from the shot point. For equidistant spacings of the electrodes, however, small electrical anisotropy of the ground could make one or the other of the electrodes "positive" with respect to the other one.

While we have described the phenomenon utilized in our invention and its application, it is to be understood that other and further modifications and uses of the invention may be apparent to those skilled in the art. The invention therefore, should not be considered as limited to the details and modifications set forth, but its scope is properly to be ascertained from the appended claims.

We claim:

1. In seismic geophysical surveying, the steps which comprise propagating an identifiable seismic wave front from a point below the weathered layer toward the ground surface, detecting between two points of the ground surface unequally spaced from said point electric-voltage variations which are substantially coincident with the arrival of said front at the base of said weathered layer and which are independent of unrelated current flow in the ground, detecting ground motions coincident with the arrival of said front at the ground surface, and recording as two separate functions of time said electric-voltage variations and a function of said ground motions at the ground surface.

2. In seismic geophysical surveying, the steps which comprise propagating an identifiable seismic wave front from a point below the weathered layer toward the ground surface, detecting between two points of the ground surface one of which is at least approximately located above said propagation point and the other of which is relatively farther away from said propagation point, a varying electrical voltage which substantially coincides in time with the arrival of said front at the base of said layer and which is independent of unrelated current flow in the ground, detecting ground motions due to the arrival of said front at the ground surface substantially above said propagation point, and recording as separate functions of time said varying electrical voltage and a function of said ground motions.

3. In seismic geophysical surveying, the steps which comprise propagating an identifiable seismic wave front generally vertically from a given point through the weathered layer, detecting at the ground surface between two spaced points near but unequally spaced from said given point, electric-voltage variations which are substantially coincident in time with the arrival of said front at the base of said weathered layer and which are independent of unrelated current flow in the ground, detecting ground motions indicative of the arrival of said front at the ground surface, and recording as separate functions of time following the initiation of said front, said electric-voltage variations and indications of said ground motions at the ground surface.

4. In seismic geophysical surveying, the steps which comprise creating a definite seismic wave front by detonating an explosive charge in a shot-hole at a depth below the lower boundary of the weathered layer, detecting the variations of electrical potential which substantially coincide with the impingement of said front on said boundary, and which occur at the ground surface between a first electrode close to said shot-hole and a second electrode relatively farther away from said shot-hole than said first electrode, detecting with a seismometer ground motions indicative of the arrival of direct seismic waves at the ground surface adjacent said shot-hole, and recording as two separate functions of time following the detonation of said charge, said variations and the output of said seismometer, whereby the weathering travel time can be directly ascertained as the time interval between receipt of the first prominent electrical-potential variations and the detection of said ground motions.

5. In seismic geophysical surveying, the steps which comprise initiating identifiable seismic waves at a point in the earth below the weathered layer, detecting, in the absence of substantial current flow through the earth between a pair of spaced electrodes at the ground surface near said point, the occurrence between said electrodes of a voltage impulse substantially coincident with the arrival of said waves at the base of said layer, detecting ground motions coincident with the arrival of said waves at a seismometer location on the ground surface, and recording as two separate functions of time said voltage impulse and a function of said ground motions, whereby the travel time of said waves in said layer can be directly determined as the difference between said impulse occurrence and the on-set of said ground motions.

References Cited in the file of this patent

UNITED STATES PATENTS

| | | |
|---|---|---|
| 2,054,067 | Blau et al. | Sept. 15, 1936 |
| 2,062,151 | Weatherby | Nov. 24, 1936 |
| 2,276,335 | Peterson | Mar. 17, 1942 |
| 2,544,569 | Silverman | Mar. 6, 1951 |
| 2,792,068 | Peterson | May 14, 1957 |
| 2,805,727 | Bazhaw | Sept. 10, 1957 |